Nov. 25, 1958     R. C. SEANOR     2,861,435
FLOATING GEAR ASSEMBLY FOR CALENDER ROLLS
Filed Oct. 4, 1956
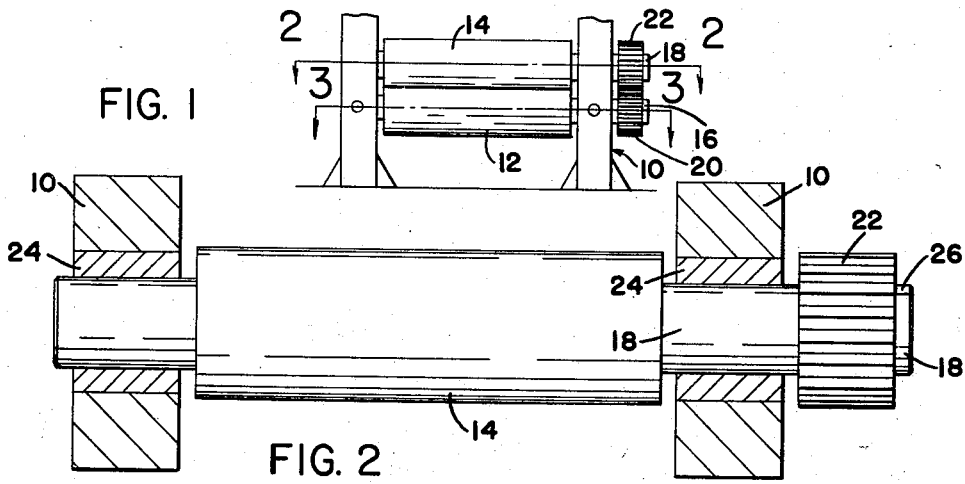
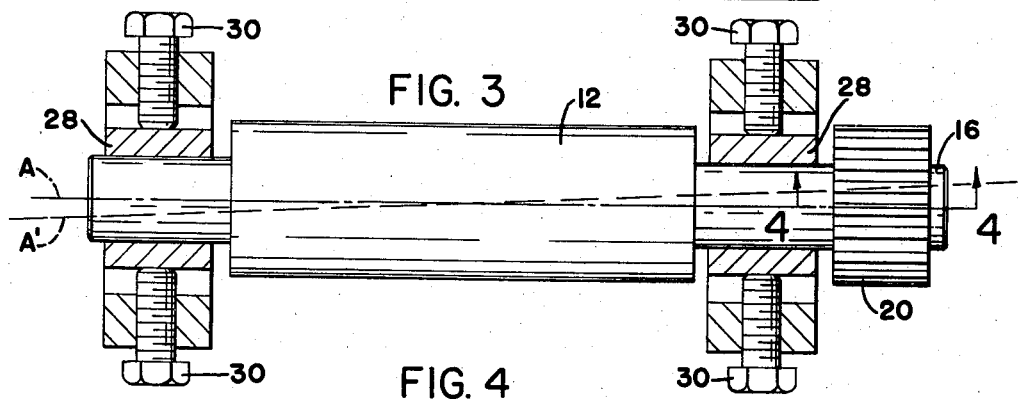
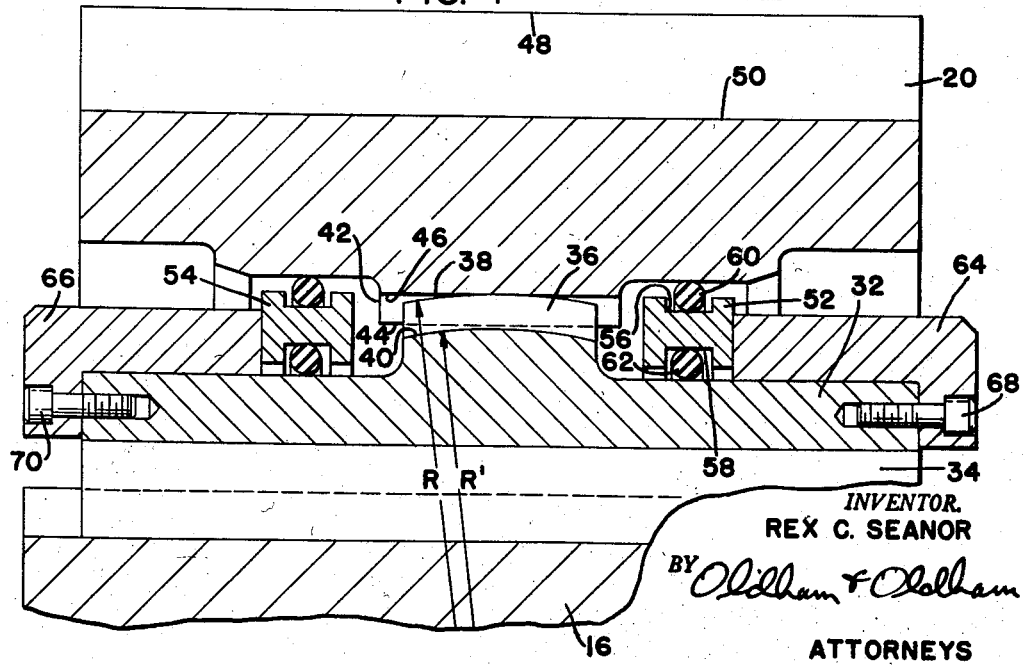
INVENTOR.
REX C. SEANOR
BY Oldham & Oldham
ATTORNEYS

United States Patent Office 2,861,435
Patented Nov. 25, 1958

2,861,435

FLOATING GEAR ASSEMBLY FOR CALENDER ROLLS

Rex C. Seanor, Akron, Ohio, assignor to Adamson-United Co., Akron, Ohio, a corporation of Ohio Application October 4, 1956, Serial No. 613,879

2 Claims. (Cl. 64—9)

This invention relates to calender rolls or the like in which the cooperating roll axes can be inclined or skewed in relation to each other to control the edge-to-edge thickness of the material being formed by the rolls, and, more particularly, is concerned with a floating gear assembly for mounting one or more of the gears driving the calender rolls.

It has been proposed heretofore to skew or angle the axes of calender rolls and the like in relation to each other so as to provide edge-to-edge thickness control for the material being operated on by the rolls. It is possible to skew the axes of the calender rolls in relation to each other if the rolls are driven by universally jointed jack shafts which likewise permit to and from adjustment between the rolls. However, such universally jointed jack shafts are expensive and space consuming, and it is possible to skew the roll axes very slightly and still maintain a drive between cooperating driving gears mounted directly upon the roll necks, the skewing being possible due to the play or clearance between the driving gears.

However, in order to skew the roll axes within reasonable control limits cooperating driving gears become sufficiently out of line to be impractical. In an effort to improve the alignment, it has been suggested in U. S. Patent No. 2,525,744 in Fig. 5 and corresponding description, to make the driving gear in two parts and to mount it on the roll neck so that gear has some tilting movement in relation to the roll axis. Driving pins between the roll neck and gear are provided. The pins act like the pivot pins in a universal joint with attendant changes of speed between the gear and the roll neck, and with only certain of the pins carrying the torsional force at any instant of rotation.

It is the general object of my invention to avoid and overcome the foregoing and other difficulties of and objections to prior art practices by the provision of an improved floating gear assembly for use on calender rolls and the like, the assembly permitting skewing of the calender rolls within reasonable control limits.

Another object of my invention is to provide a tilting gear mounting of a drive gear on a calender roll neck wherein the torsional forces are, at any instant, distributed uniformly around the entire circumference of cooperating internal and external gear means rotationally securing the driving gear on the roll neck, and wherein the rotation speeds of the calender roll surface and the driving gear remain constant in relation to each other.

Another object of my invention is the provision of the combination of a calender roll and a floating driving gear characterized by high strength, simplicity of construction, relatively low initial and maintenance cost, and wherein driving force concentrations are avoided.

The foregoing objects of my invention, and other objects which become apparent as the description proceeds are achieved by the provision in combination of a calender frame, a pair of cooperating rolls journalled in the frame, means for skewing the axis of one roll in relation to the axis of the other roll, a pair of roll driving gears engaging each other, key means securing one gear to one roll, external gear means on the other roll and internal gear means on the second gear engaging to secure the second gear rotationally to the other roll, at least one of said external or internal gear means having the crests and roots of its gear teeth formed in axial direction to an arc swung substantially from the axial center of said gear means to allow skewing of one calender roll without disturbing the driving relation between the pair of roll driving gears.

For a better understanding of my invention, reference should be had to the accompanying drawings wherein Fig. 1 is a front elevation, partly broken away, of a calender, or the like, incorporating the principles of my invention;

Fig. 2 is a horizontal sectional view, on enlarged scale, taken substantially on line II—II of Fig. 1;

Fig. 3 is a view similar to Fig. 2 but taken on line III—III of Fig. 1; and

Fig. 4 is an enlarged fragmentary view of the floating gear assembly per se, and taken substantially on line IV—IV of Fig. 3.

In the drawings, the numeral 10 indicates the frame of a calender or similar apparatus having a pair of cooperating rolls 12 and 14 journalled therein and having roll necks 16 and 18 upon which are mounted gears 20 and 22 which engage in driving relationship with each other.

As seen in Fig. 2, roll 14 is mounted in bearings 24 receiving the reduced diameter neck or journal portions of the roll, and with a key 26 fastening the gear 22 to the roll neck 18.

The bearings 24 are received in the frame 10, so that the bearings are held against horizontal movement, but with the bearings usually being capable of vertical adjustment by conventional means not shown to thereby control the thickness of the material being operated upon by the calender rolls.

Fig. 3 illustrates that the roll 12 has its reduced diameter journal or neck portions received in bearings 28 which are usually held in a fixed vertical position, but with the bearings 28 being adapted to be adjusted horizontally by means of screws 30, or other suitable means so as to skew or tilt the axis of the roll 12 from an aligned parallel position indicated by the dot and dash line A to a position indicated by the dash line A' to thereby control the edge-to-edge thickness of the material being worked by the calender roll, all in accord with known techniques of skewing calender rolls.

The gear 20 is mounted on the roll neck 16 in the manner illustrated in Fig. 4. Specifically, a sleeve 32 is secured by a key 34 to the roll neck 16, and the sleeve is provided with a circumferentially continuous gear 36 having a diameter greater than the sleeve. The gear 36 is positioned axially centrally of the sleeve 32, but the teeth of the gear 36 are materialy shorter than the length of the sleeve. The crests 38 of the gear teeth and the roots 40 are contoured to an arc or radius R and R' respectively, swung from the axial center of the sleeve 32.

Cooperating with the gear 36 is an internal gear 42 of circumferentially continuous type formed on the inner periphery of the gear 20. The gear 42 is of an axial length just slightly greater than that of the gear 36, and with the crests 44 and roots 46, as well as the crests 48 and roots 50 of gear 20 being substantially parallel to the axis of the gear 20.

In order to seal grease in the space between the gears 36 and 42, a pair of rings 52 and 54 are provided on either side of the gear 36, each ring having an external channel 56 and an internal channel 58 receiving, respectively, rubber O-rings 60 and 62 which engage, respectively, with the inner periphery of gear 20 and the outer periphery of sleeve 32. Gland rings 64 and 66 are fastened by cap screws 68 and 70 to the ends of the sleeve 32 to hold the rings 52 and 54 against axial outward movement.

In the operation of the apparatus as described, it is possible for the gear 20 to tilt in relation to the sleeve 32 or roll neck 16 to allow a continuous drive between the gears 20 and 22 when the roll 12 is skewed in relation to the roll 14, and with the tilting of the gear 20 in relation to the roll neck 16 constantly changing as the roll revolves, but leaving the teeth of gears 20 and 22 in positive driving relationship at all times. The angular speeds of the surface of the roll 12 and the gear 20 do not change in relation to each other as the roll rotates. At all times, during this driving relationship, the gear 36 is engaging with the gear 42 over a full circumferential area with the relatively large number of teeth on the inter-engaging gears carrying the torsional forces and distributing these forces over all of the teeth of the cooperating itnernal gear 42 and external gear 36. Because of the distribution of these forces over the entire circumference, not only is the speed between the roll neck 16 and the gear 20 kept constant, but the size of the teeth in the gears 36 and 42 may be kept to the relatively small size shown to transmit the same forces as transmitted by the teeth of gears 20 and 22 which engage with each other only several teeth at a time.

The rocking or tilting of the gear 20 on the roll neck 16 is permitted by the rubber O-rings 60 and 62 without loss of lubricant from between the gears.

It should also be pointed out that the position of rolls 12 and 14 as shown in Fig. 1 may be reversed if it is desirable to skew a middle roll of the calender rather than the bottom roll, all without changing the function of the floating gear assembly.

While in accord with the patent statutes, I have specifically illustrated and described one best known embodiment of my invention, it is to be particularly understood that I am not to be limited thereto or thereby, but that the scope of my invention is defined in the appended claims.

I claim:

1. In combination, a calender roll, journals on the ends of the calender roll of lesser diameter than the roll, a sleeve over a portion of one journal, means keying the sleeve to the journal, a sleeve gear formed around the axial center of the periphery of the sleeve and of greater diameter than the sleeve, the sleeve gear being materially shorter in an axial direction than the length of the sleeve, the roots and crests of the teeth of the sleeve gear in an axial direction lying substantially on an arc thrown from the axial center of the sleeve, an internal-external gear of substantially the axial length of the sleeve, the gear teeth on the outer periphery of the internal-external gear extending the full length thereof, the gear teeth on the inner periphery of the internal-external gear having an axial length about equal to those of the sleeve gear and engaging the teeth of the sleeve gear over the full circumference thereof, the roots and crests of the gear teeth on the outer and inner peripheries of the internal external gear lying substantially parallel to the axis thereof, the central plane of rotation of the internal-external gear being coincident with the center of axial curvature of the teeth of said sleeve gear whereby the center of pressure of all the gear teeth is in the same plane of rotation, a pair of rings each having an external and an internal channel positioned in spaced relation between the sleeve and the internal-external gear with one ring on either side of the gear, a rubber O-ring in each channel and engaging respectively with the sleeve and the internal and external gear, and means holding the rings against axially outward displacement.

2. Apparatus in combination with a roll for driving the roll while permitting angular adjustment of the axis of the roll, which apparatus comprises a hub adapted to be secured to the roll, an internally and externally toothed ring gear about said hub, said hub having a central toothed portion flanked by cylindrical neck portions of reduced diameter, the toothed portion comprising spur teeth curved axially at a radius whose center is substantially at the axis of the gear midway of the width of the teeth, the largest pitch diameter of the curved teeth being substantially equal to the pitch diameter of the internal teeth of the ring gear, radially deformable annular sealing means about said necks within said ring gear for sealing the space therebetween while permitting angular adjustment therebetween, said sealing means each comprises a ring of substantially H-shape in radial section, a resilient O-ring engaged with and protruding radially inwardly from the inner portion of said H-shape ring to engage the neck portion of said hub, and a resilient O-ring engaged with and protruding radially outwardly from the radially outer portion of said H-shaped ring and engaging said ring gear, and annular stops on the reduced neck portions of said hub to limit axial movement of said sealing means.

References Cited in the file of this patent

UNITED STATES PATENTS

| | | |
|---|---|---|
| 1,769,158 | Oechsle | July 1, 1930 |
| 2,035,171 | Loewus | Mar. 24, 1936 |
| 2,271,060 | Case | Jan. 27, 1942 |
| 2,303,813 | Barcus | Dec. 1, 1942 |
| 2,525,744 | Willshaw | Oct. 10, 1950 |
| 2,638,011 | Smith | May 12, 1953 |
| 2,682,760 | Sltenk | July 6, 1954 |
| 2,744,449 | Belden et al. | May 8, 1956 |